United States Patent
Bai et al.

(10) Patent No.: US 11,803,462 B1
(45) Date of Patent: Oct. 31, 2023

(54) SYSTEM AND METHOD FOR AUTOMATICALLY GENERATING TEST CASES FOR TESTING SDKS

(71) Applicant: Agora Lab, Inc., Santa Clara, CA (US)

(72) Inventors: Jiyu Bai, Shanghai (CN); HuaMing Zhang, Shanghai (CN); Xuewen Xu, Shanghai (CN); Sheng Zhong, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 65 days.

(21) Appl. No.: 17/730,483

(22) Filed: Apr. 27, 2022

(51) Int. Cl.
*G06F 11/36* (2006.01)

(52) U.S. Cl.
CPC .................. *G06F 11/3684* (2013.01)

(58) Field of Classification Search
CPC .................................................. G06F 11/3684
See application file for complete search history.

(56) References Cited

U.S. PATENT DOCUMENTS

| | | | | |
|---|---|---|---|---|
| 8,839,202 B2 * | 9/2014 | Tempel | ............... | G06F 11/0712 |
| | | | | 717/124 |
| 9,292,416 B2 * | 3/2016 | Gibbens | ............... | G06F 11/3664 |
| 2014/0109052 A1 * | 4/2014 | Tempel | ................. | G06F 11/368 |
| | | | | 717/124 |
| 2014/0109061 A1 * | 4/2014 | Gibbens | ............. | G06F 11/3688 |
| | | | | 717/126 |
| 2017/0192883 A1 * | 7/2017 | Yuan | .................... | G06F 11/3688 |

FOREIGN PATENT DOCUMENTS

| | | | | |
|---|---|---|---|---|
| CN | 101930400 | | 12/2010 | |
| CN | 102323906 | | 1/2014 | |
| CN | 108334441 A | * | 7/2018 | |
| CN | 111694733 A | * | 9/2020 | ......... G06F 11/3684 |

OTHER PUBLICATIONS

Dabbagh et al., "Performance Analysis of Blockchain Platforms: Empirical Evaluation of Hyperledger Fabric and Ethereum" (Year: 2020).*
Image method for efficiently simulating small-room acoustics, Jont B. Allen, et al., Acoustics Research Department, Bell Laboratories, Murray Hill, New Jersey 07974, 1979 Acoustical Society of America.

\* cited by examiner

*Primary Examiner* — Phillip H Nguyen
(74) *Attorney, Agent, or Firm* — The Law Offices of Konrad Sherinian, LLC; Depeng Bi (57) ABSTRACT

An automatic SDK testing case generation system includes a computer software application for automatically generating optimized test cases. The automatic SDK testing case generation system categorizes candidate APIs presented by an SDK to be tested. The categories conform to an API call category sequence. The system iterates through API calling paths, which conform to the API call category sequence, to generate optimized subsets of test cases. The combination of the optimized subsets of test cases forms the final set of test cases for being used to test the SDK.

9 Claims, 6 Drawing Sheets

SYSTEM AND METHOD FOR AUTOMATICALLY GENERATING TEST CASES FOR TESTING SDKS

CROSS REFERENCE TO RELATED APPLICATIONS

None.

FIELD OF THE DISCLOSURE

The present invention generally relates to computer software testing, and more particularly relates to a system and method for automatically generating testing cases. More particularly still, the present disclosure relates to a system and method for automatically generating optimized testing cases of software development kits.

DESCRIPTION OF BACKGROUND

As the information technologies and their applications are rapidly growing, more and more software applications running on mobile devices (such as smartphones and tablet computers) and other types of computing devices (such as laptop computers and desktop computers) are being and will be developed worldwide. Such computer software applications are also generally referred to as mobile apps (also Mobile Apps). Mobile apps are written in computer programming languages, SWIFT®, Objective-C, C, C++, etc. The feature sets of mobile apps are becoming richer each day. For faster and better product development, companies and organizations oftentimes use third-party Software Development Kits (SDKs) to implement certain sets of features in their mobile apps. Instant messaging SDKs and real-time audio and video communication SDKs are two typical types of SDKs.

Each SDK presents and provides a set of Application Programming Interfaces (APIs) for providing certain features and functions. APIs generally fall into two categories. One category of APIs are direct calls into the SDK. For example, a direct call API with zero or some number of parameters directs the SDK to perform a function. The direct call API may and may not returns a resulting value. Another category of APIs are callback APIs.

One challenge with using third-party SDKs is to test and verify the functionality, reliability, scalability, performance, and other features and characteristics of the SDKs. SDK testing usually includes designing test cases and running the test cases. Test engineers design the test cases based on their experience or randomly generate the test cases. A test case includes a list of APIs of the SDK. When the test case is executed, the APIs within the list are executed in order from the first API to the last API in the list. The conventional approach presents numerous shortcomings and defects. For example, the number of test cases for testing different API combinations of a particular SDK is usually a huge number, while the manually designed test cases are limited in quantity and are not sufficient to cover all different use cases. Manually designing and executing test cases by mobile app test engineers usually takes too much time and financial costs that are undesirable and even not acceptable pursuant to product launch plans.

As another example, a randomly generated test case may well be a use case that is unlikely to occur in reality. In addition, a randomly generated test case can be very long and is thus not debugging friendly. As still a further example, it is oftentimes very difficult to control the depth of a manually designed test case, assure that it has high use case coverage, and detect SDK crashes.

Accordingly, there is a need for an automated SDK test case generation system and method that overcomes the shortcomings of the conventional SDK test case generation mechanisms. The automated SDK test case generation system and method provide the benefits of low maintenance, short execution cycle and SDK crash detection, short depth and high use case coverage. The automated SDK test case generation system is implemented, for example, as a computer software application, which can run on a mobile device and/or other types of computers, and is adapted to perform the method to automatically generate testing cases.

SUMMARY OF THE DISCLOSURE

Generally speaking, pursuant to the various embodiments, the present disclosure provides a method for automatically generating optimized test cases for testing a software development kids (SDK). The method is performed by an automatic SDK testing case generation system and includes constructing a candidate set of application programming interfaces (APIs) from a list of APIs provided by an SDK; setting default values for parameters of APIs within the candidate set of APIs; categorizing APIs within the candidate set of APIs, thereby forming a set of categories of APIs, the set of categories of APIs conforming to an API call category sequence having a set of API call category sequence segments, each category of APIs belonging to a single segment within the set of API call category sequence segments, APIs within any individual category of APIs within the set of categories of APIs having a same API calling priority, categories of APIs within the set of categories of APIs belonging to a same segment within the set of API call category sequence segments having a same API calling priority, categories of APIs within the set of categories of APIs belonging to different segments within the set of API call category sequence segments having different API calling priorities; coding APIs within each category of APIs of the set of categories of APIs; determining a first API call path conforming to the API call category sequence; generating a first set of test cases conforming to the first API call path; operating on the first set of test cases to generate a first final subset of test cases; switching to a second API call path conforming to the API call category sequence; generating a second set of test cases conforming to the second API call path; operating on the second set of test cases to generate a second final subset of test cases; and combining the first final subset of test cases and the second final subset of test cases to form a final set of test cases. The generating a first set of test cases conforming to the first API call path includes randomly determining a test case depth for a test case to be generated; randomly determining a set of test case segment depths of the test case depth corresponding to the set of categories of APIs conforming to the first API call path, wherein a sum of all test case segment depths within the set of test case segment depths is same as the test case depth; from each category of APIs within the set of categories of APIs, randomly selecting a sequence of APIs, wherein a number of APIs within the selected sequence of APIs is the same as the corresponding test case segment depth within the set of test case segment depths; and setting the selected sequences of APIs collectively as API calls of the test case within the first set of test cases. The operating on the first set of test cases to generate a first final subset of test cases includes for each test case within the first set of test cases, decoding encoded APIs within the test case, thereby forming a decoded list of API calls; for each test case within the first set of test cases, causing the decoded list of API calls executed; for each test case within the first set of test cases, obtaining a set of test case objective functions of the test case is executed; conducting a fitness evaluation on the sets of test case objective functions corresponding to the first set of test cases; determining a fitness value for each test case within the first set of test cases, thereby forming a set of fitness values; based on the set of fitness values, selecting a subset of test cases from the first set of test cases; and for each test case within the selected subset of test cases, deriving a set of test cases, wherein the selected subset of test cases and derived sets of test cases form the first final subset of test cases. Each test case objective function within the set of test case objective functions includes the test case depth, a coverage and an SDK crash status; and the fitness value is derived from a fitness level. The deriving a set of test cases includes at least one of a crossover operation and a mutation operation.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
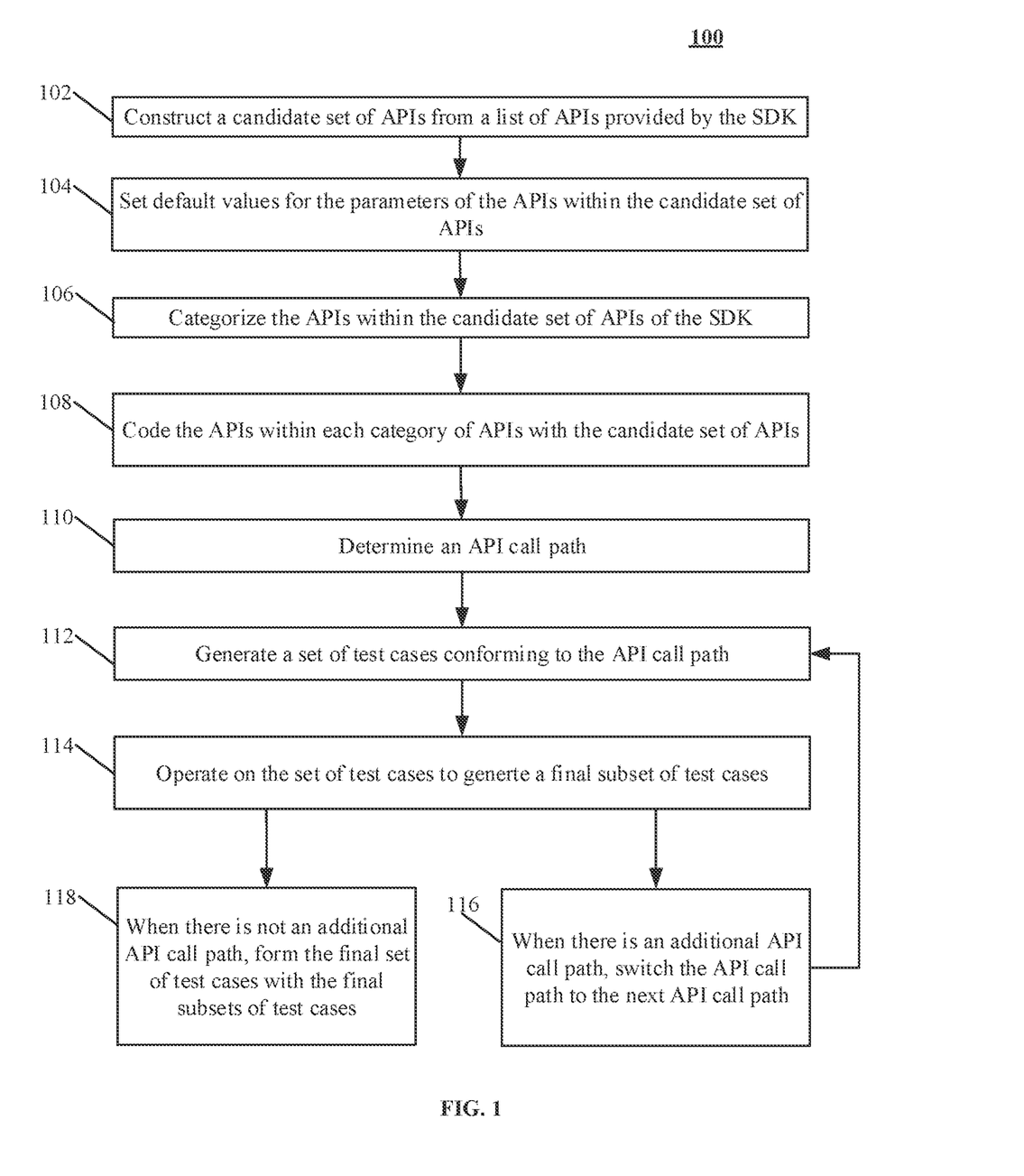
FIG. 1 is a flowchart illustrating a process by which a computer software application automatically generates a set of test cases for testing an SDK in accordance with this disclosure.

Turning to the Figures and to FIG. 1 in particular, a flowchart depicting a process by which SDK test cases (also interchangeably referred to herein as testing cases) are automatically generated is shown and generally indicated at 100. In one implementation, the automatic SDK testing case generation method 100 is performed by an automatic SDK testing case generation system comprising a computer software application. The process 100 is also said to be performed by the automatic SDK testing case generation software application, such as a mobile app or a desktop computer software application. The automatic SDK testing case generation software application is written in one or more computer programming languages. The computer programming languages can be, for example, SWIFT®, Objective-C, C, C++, Java, etc.

At 102, the automatic SDK testing case generation system constructs a candidate set of APIs from the list of APIs provided by an SDK (such as an instant messaging SDK and a real-time audio and video communication SDK) to be tested. As used herein, set means one or more. In one implementation, the candidate set of APIs of the SDK includes all the direct call APIs of the SDK. In a different implementation, the candidate set of APIs of the SDK includes a subset of all the direct call APIs of the SDK. At 104, the automatic SDK testing case generation system sets default values for the parameters of APIs within the candidate set of APIs. At 106, the automatic SDK testing case generation system categorizes the APIs within the candidate set of APIs of the SDK to divide the candidate set of APIs into a set of categories of APIs. A category of APIs is also interchangeably referred to herein as an API category. Each API category is a subset of the candidate set of APIs. An illustration of the set of categories of APIs are shown in FIG. 5.

Figure 5:
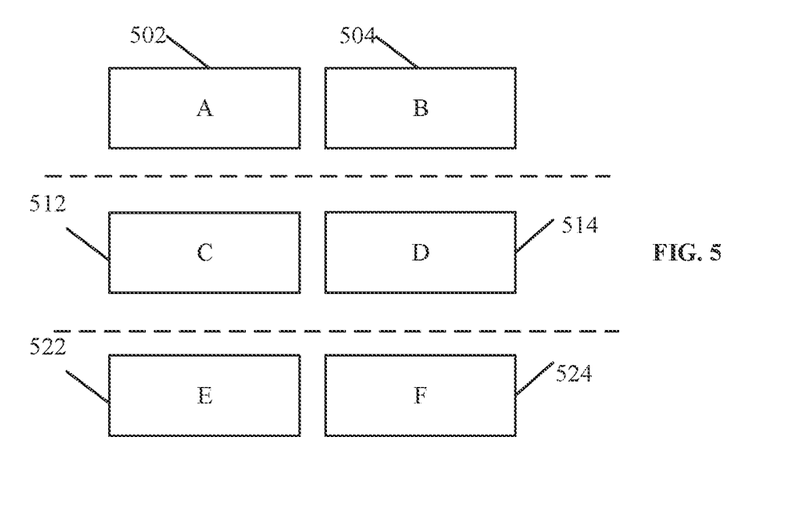
FIG. 5 is a block diagram illustrating a set of categories of APIs of an SDK in accordance with this disclosure.

Referring to FIG. 5, a block diagram illustrating categories of APIs and an API call category sequence are shown. Six illustrative categories of APIs are indicated at 502, 504, 512, 514, 522 and 524. They are also referred herein as API category A, API category B, API category C, API category D, API category E and API category F respectively. Each API category includes a set of APIs. A test cases includes a list of APIs of the SDK that are executed in order. The APIs within the list belong to all or some of the API categories. The APIs within the test case usually need to follow an API call category sequence.

The illustrative API call category sequence requirement shown in FIG. 5 indicates that any category 502 API needs to be called, when called, before any category 512, 514, 522 and 524 APIs; any category 504 API needs to be called, when called, before any category 512, 514, 522 and 524 APIs; any category 512 API needs to be called, when called, before any category 522 and 524 APIs; and any category 514 API needs to be called, when called, before any category 522 and 524 APIs.

Furthermore, the API calling priority of APIs within each category is same. For example, for any two APIs, say API X and API Y, within a particular category, such as API category 502, the API X can appear before or after the API Y in any test case. In addition, the API categories 502 and 504 have the same API calling priority. For example, for any API X from the category A and any API Y from the category B, the API X can appear before or after the API Y in any test case. The API categories A and B are thus said to have the same API calling priority and are at the same layer (also referred to herein as segment) within the API call category sequence. The same is true between the categories C and D, and between the categories E and F.

The illustrative API call category sequence consists of three layers. The API categories A and B are at the first layer; API categories C and D are at the second layer; and API categories E and F are at the third layer. The API calling priority of the categories A and B is higher than the API calling priority of the categories C and D, while API calling priority of the categories C and D is higher than the API calling priority of the categories E and F. API categories at the same layer have the same API calling priority while API categories at different layers have different API calling priorities.

Turning back to FIG. 1, at 108, the automatic SDK testing case generation system codes the APIs within the candidate set of APIs of the SDK. In other words, at 108, the automatic SDK testing case generation system codes the APIs within each API category within the set of categories of APIs of the SDK. For example, the APIs within the category A are coded as 1 through 50. 1 and 50 are the lower and upper bounds respectively. Alternatively, the APIs within the category A are coded as A1 through A50; and the APIs within the category E are coded as E1 through E45, assuming there are 45 APIs in the category E as an example.

At 110, the automatic SDK testing case generation system determines an initial API calling path (also interchangeably referred to herein as API call path) for automatically generating testing cases of the SDK. The test case generation process 100 starts with the initial API calling path and iterates over other API calling paths. Two illustrative API call paths are shown in FIGS. 6 and 7, and generally indicated at 600 and 700 respectively.

Figure 6:
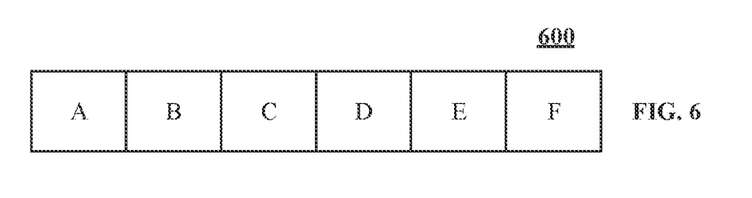
FIG. 6 is a block diagram illustrating an API call path of an SDK in accordance with this disclosure.
Figure 7:
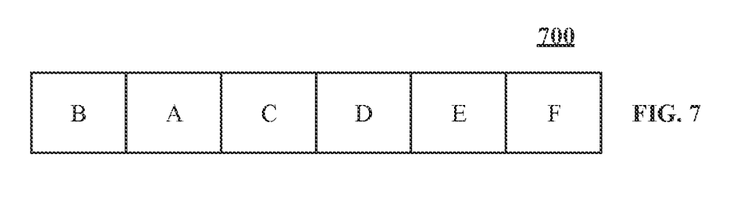
FIG. 7 is a block diagram illustrating an API call path of an SDK in accordance with this disclosure.

Referring to FIGS. 6 and 7, two block diagrams illustrating two API call paths are shown. The API calling path 600 indicates that APIs of testing cases are selected from the categories A through F, and each testing case's APIs from these categories appear and are executed in the order of APIs from category A, APIs from category B, APIs from category C, APIs from category D, APIs from category E, and then APIs from category F. The API calling path 700 differs from the API calling path 600 in that each testing case's APIs from these categories appear and are executed in the order of APIs from category B, APIs from category A, APIs from category C, APIs from category D, APIs from category E, and then APIs from category F. The order of APIs within each category is irrelevant.

Turning back to FIG. 1, at 112, the automatic SDK testing case generation system generates a set of test cases conforming to the current API call path. For the first iteration of the process 100, the current API call path is the initial API call path. For each iteration, the current API call path is updated or switched. At 114, the automatic SDK testing case generation system operates on the set of test cases to generate a final subset of test cases. The final subset of test cases is an optimized set of test cases that are derived from the set of test cases. When there is an additional API call path to operate on, at 116, the automatic SDK testing case generation system switches to the next API call path. The next API call path is different from the previous current API call path, and becomes the current API call path for the next iteration after the switch. After the element 116, the process 100 and the execution path loop back to the element 112 to generate the next final subset of testing cases of the SDK. When there is not any additional API call path to operate on, at 118, the automatic SDK testing case generation system forms the final set of test cases by combining the final subsets of test cases of the SDK. The final set of test cases is the output of the process 100.

Figure 2:
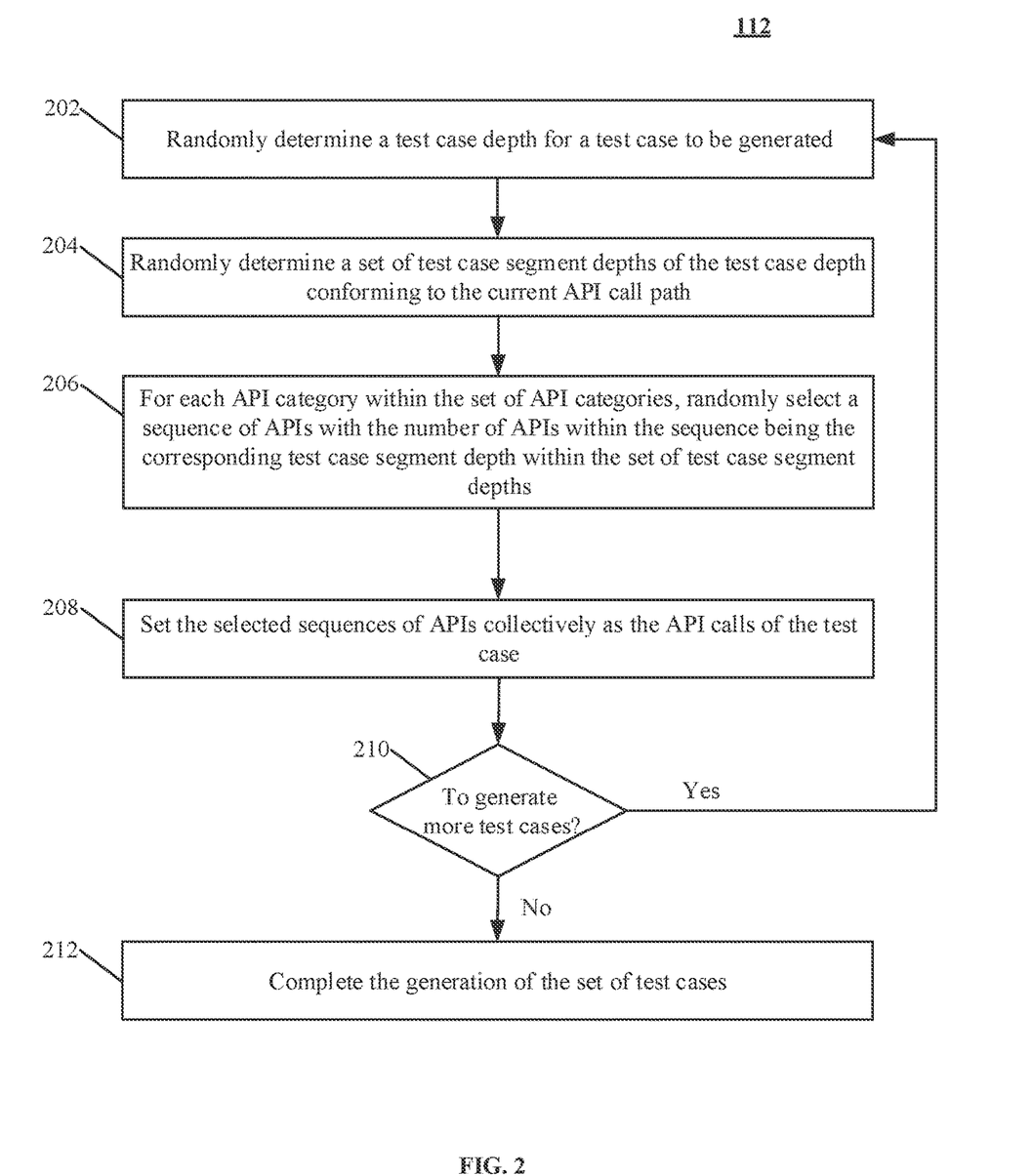
FIG. 2 is a flowchart illustrating a process by which a computer software application automatically generates a set of test cases for testing an SDK in accordance with this disclosure.
Figure 3:
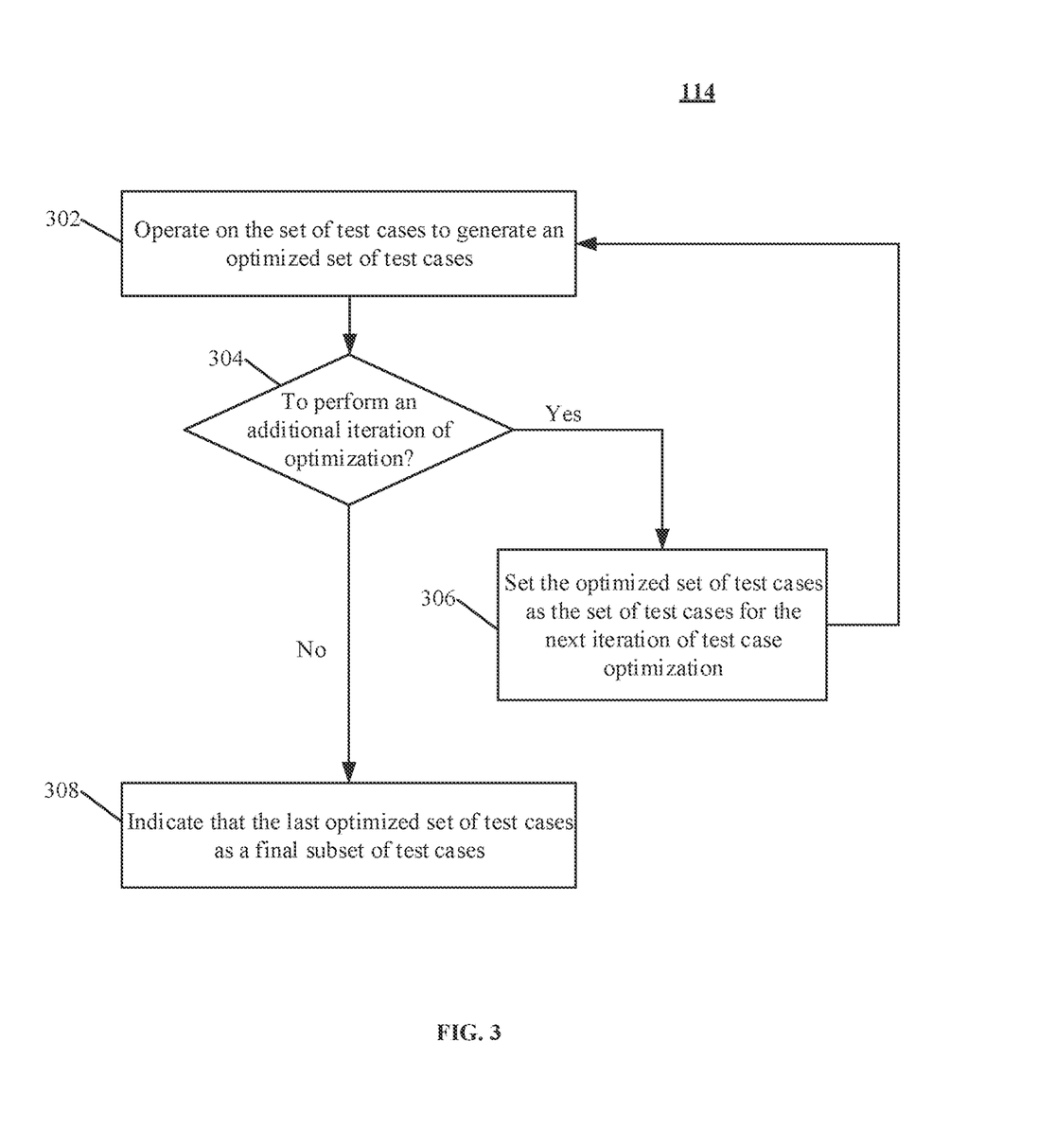
FIG. 3 is a flowchart illustrating a process by which a computer software application automatically generates a set of test cases for testing an SDK in accordance with this disclosure.

The element 112 and 114 are further illustrated in FIGS. 2 and 3 respectively. Referring first to FIG. 2, a flowchart illustrating a process by which the automatic SDK testing case generation system generates a set of test cases conforming to an API call path is shown and generally indicated at 112. At 202, the automatic SDK testing case generation system randomly determines a test case depth for a test case to be generated. The test case depth is the number of APIs of the test case. The depth meets one or more constraints. For instance, it is one or bigger. Another constraint is an upper limit to avoid generating a test case with an unreasonable number of API calls, such as 40, 150, etc.

At 204, the automatic SDK testing case generation system randomly determines a set of test segment depths of the test case depth conforming to the current API call path. The number of the test segment depths within the set of test segment depths is same as the number of API categories. The set of test segment depths also meets one or more constraints. For example, no test segment depth is below zero. As another example, the sum of the test segment depths of the set of test segment depths is same as the test case depth. Each test segment depth within the set of test segment depths means the number of APIs from the corresponding API category. Taking the API call path 700 as an example, the set of test segment depths consists of, for example, 2, 0, 4, 6, 7 and 1. It means that, for the next test case to be automatically generated, the number of APIs selected from the categories A, B, C, D, E and F are 2, 0, 4, 6, 7 and 1 respectively.

At 206, the automatic SDK testing case generation system randomly selects, from each API category within the set of API categories, a sequence of APIs with the number of the selected APIs from the API category being the corresponding test case segment depth within the set of test segment depths. At 208, the automatic SDK testing case generation system sets the selected sequences of APIs collectively as the APIs calls of the test case. The combination of all the sequences of APIs conforms to the current API call path. At 210, the automatic SDK testing case generation system determines whether there are more test cases to generate for the current API call path. For example, the determination is based on whether the number of test cases generated has reached a predetermined limit or boundary, such as 30, 50, etc. If more test cases need to be generated, the execution switches back to the element 202. Otherwise, at 212, the automatic SDK testing case generation system completes the automatic generation of test cases for the current API call path.

Referring now to FIG. 3, a flowchart illustrating a process by which the automatic SDK testing case generation system operates on the set of test cases, generated at 112, to generate a final subset of test cases is shown and generally indicated at 114. At 302, the automatic SDK testing case generation system operates on the set of test cases to generate an optimized set of test cases. At 304, the automatic SDK testing case generation system determines whether to perform an additional iteration of test case optimization. For example, when the number of iterations reaches a predetermined number of iterations, the iteration stops. If an additional iteration is desired, at 306, the automatic SDK testing case generation system indicates the optimized set of test cases, generated at 302, as the test case for the next iteration to operate on at 302. Otherwise, at 308, the automatic SDK testing case generation system indicates the last optimized set of test cases as a final subset of test cases.

Figure 4:
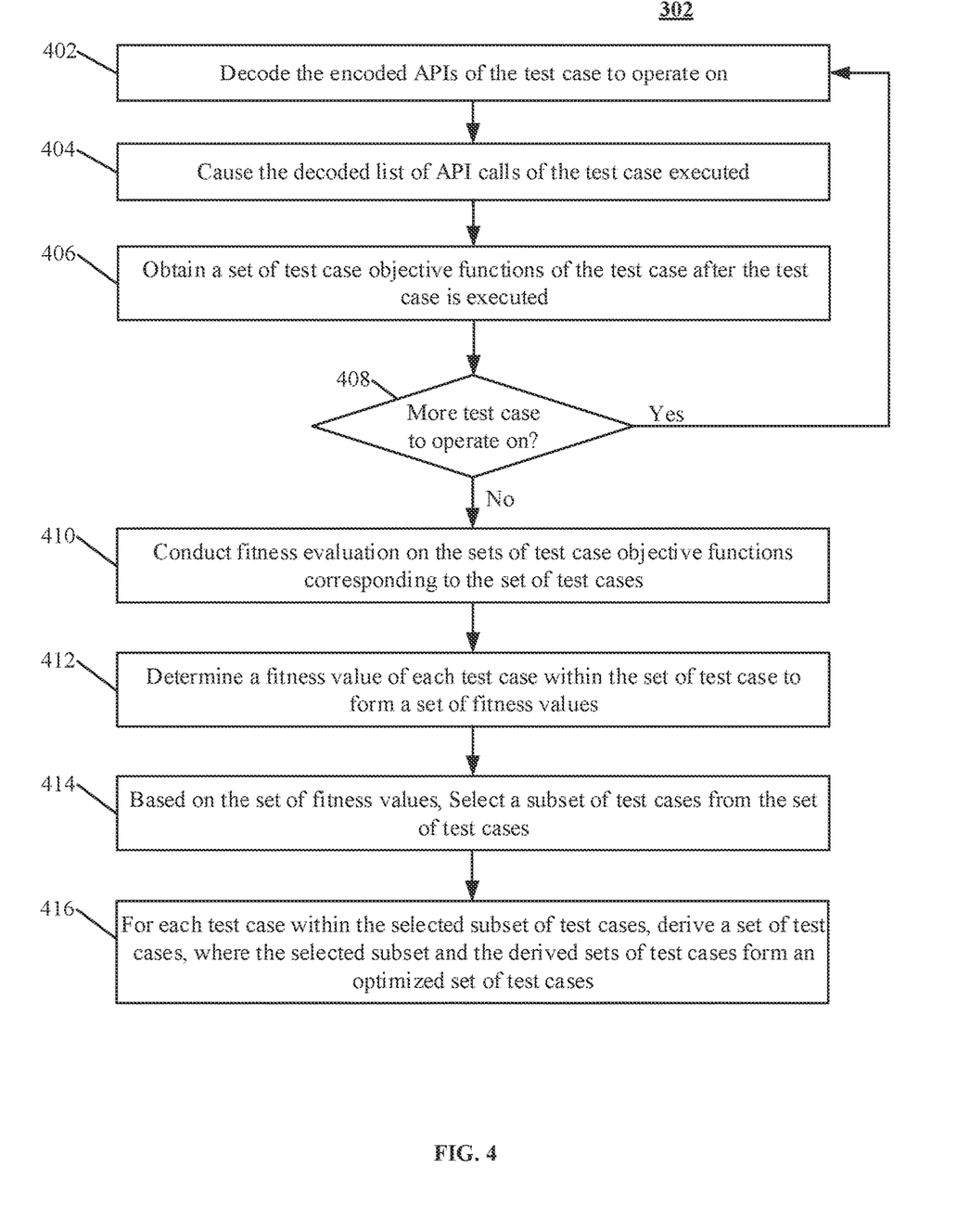
FIG. 4 is a flowchart illustrating a process by which a computer software application automatically generates a set of test cases for testing an SDK in accordance with this disclosure.

The test case optimization process 302 is further illustrated by reference to FIG. 4. Turning now to FIG. 4, a flowchart illustrating a process by which the automatic SDK testing case generation system optimizes a set of test cases, generated at 112 or optimized at 302, to generate an optimized set of test cases is shown and generally indicated at 302. The process 302 operates on each test case within the set of test cases one by one in an iterative manner. At 402, the automatic SDK testing case generation system decodes the encoded APIs of the test case of the present iteration. For example, at 402, an API, encoded as 2 or A2, is decoded to its original form that can be executed by calling it against the SDK. For instance, the API A2 is an API to enable video communication—"EnableVideo(1, 2)." As another example, the API F40 is an API to disable video communication—"DisableVideo( )"

At 404, the automatic SDK testing case generation system causes the list of decoded APIs of the test case executed. For instance, the execution is performed within an automated testing framework. At 406, the automatic SDK testing case generation system obtains a set of test case objective functions of the test case after it is executed. In one implementation, the set of test case objective functions is a three-tuple<test case depth, coverage, SDK crash status>. A coverage (also referred to herein as test coverage) is a measure of how much software program code of the SDK is executed when the test case is executed. In one implementation, the SDK crash status is obtained from the automated testing framework. For example, the value 1 indicates that the SDK has crashed when the test case is executed, while 0 indicates that the SDK has not crashed.

At 408, the automatic SDK testing case generation system determines whether there are more test cases within the set of test cases to be executed. If so, the execution of the element 114 switches back to the element 402. Otherwise, at 410, the automatic SDK testing case generation system conducts fitness evaluation on the set of sets of test case objective functions of the test case. For example, at 410, the automatic SDK testing case generation system sorts the list of three-tuples, <test case depth, coverage, SDK crash status> of the test case non-dominantly.

At 412, the automatic SDK testing case generation system determines a fitness value of each test case within the set of test cases, and thus forms a set of fitness values. For example, each fitness value is calculated with the levels (such as 1, 2, 3,) of the non-dominated sorting results using the formula below:

fitnessValue=1/level

Levels (also referred to herein as fitness levels) are the sorting results of the non-dominated sorting algorithm, and are calculated based on the list of three-tuples, <test case depth, coverage, SDK crash status>. The smaller a levels is, the better the test case is. Different test cases can have the same levels. At 414, based on the set of fitness values of the test cases within the set of test cases, the automatic SDK testing case generation system selects a subset of test cases from the set of test cases based on the set of fitness values. The selected subset of test cases consists of one or more test cases. In one implementation, the selection results are generated using roulette wheel selection method. The higher the fitness of the test case is, the higher probability it is selected At 416, for each test case within the selected subset of test cases, the automatic SDK testing case generation system derives a set of test cases. The selected subset of test cases and the derived sets of test cases form an optimized set of test cases. In one implementation, the derivation is performed using crossover and/or mutation. Crossover operation produces better testing cases while mutation operation ensures that new excellent test cases can be generated. Both crossover and mutation operations are executed on APIs of the same API category or segment of the test case.

Figure 8:
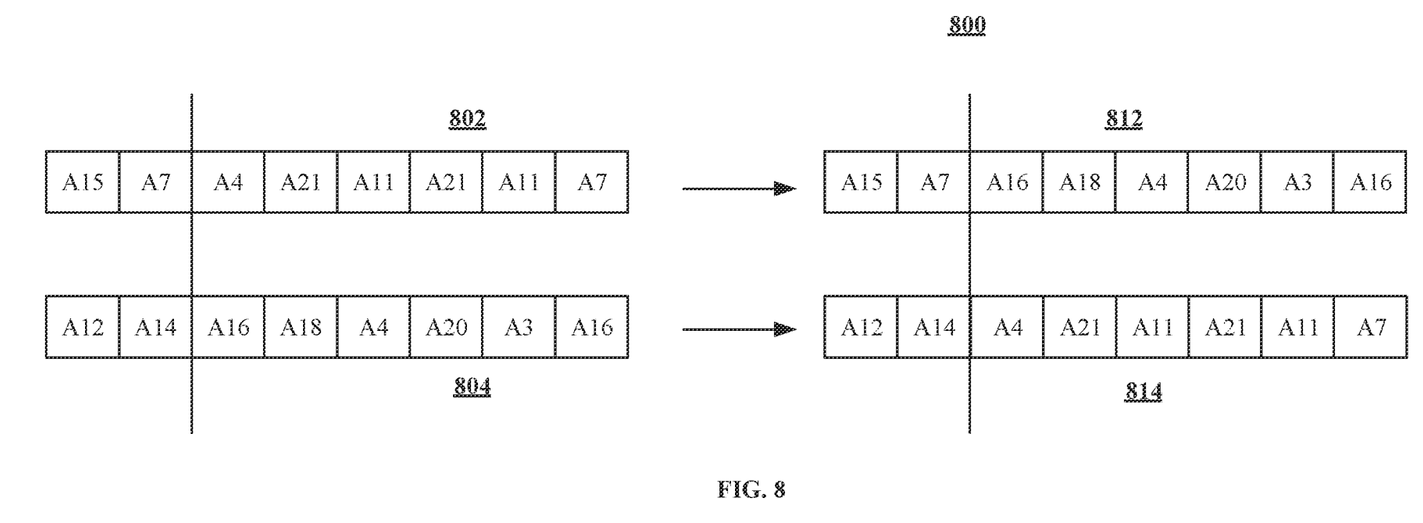
FIG. 8 is a block diagram illustrating the derivation of test cases of an SDK from an existing test case of the SDK in accordance with this disclosure.

One illustrative crossover operation is shown in FIG. 8. Turning to FIG. 8, a block diagram illustrating a crossover operation is shown and generally indicated at 800. The sequence of APIs from the API category A of an illustrative test case 802 includes APIs A15, A7, A4, A21, A11, A21, A11 and A7. The sequence of APIs from the API category A of an illustrative test case 804 includes APIs A12, A14, A16, A18, A4, A20, A3 and A16. By the crossover operation, test cases 812 and 814 are derived from the test cases 802 and 804. In particular, after the illustrative crossover operation, the first two APIs of each of the two test cases 802-804 are kept the same. However, the rest APIs of the two tests cases 802-804 are swapped with the order reserved.

Figure 9:
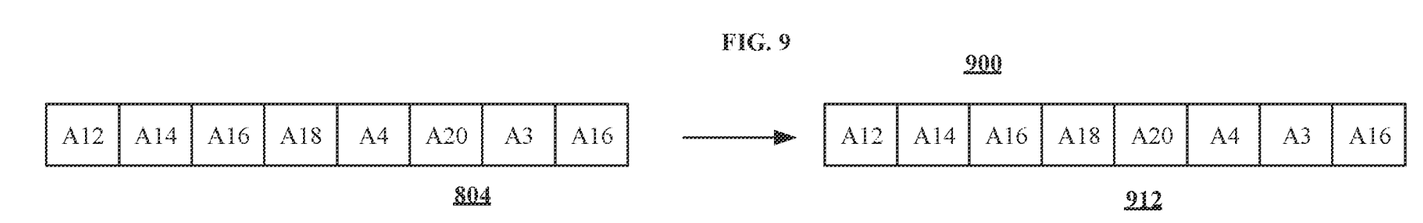
FIG. 9 is a block diagram illustrating the derivation of test cases of an SDK from an existing test case of the SDK in accordance with this disclosure.

One illustrative mutation operation is shown in FIG. 9. Turning to FIG. 9, a block diagram illustrating a mutation operation is shown and generally indicated at 900. The sequence of APIs from the API category A of an illustrative test case 804 includes APIs A12, A14, A16, A18, A4, A20, A3 and A16. By the mutation operation, test case 902 is derived from the test case 804. In particular, after the illustrative crossover operation, the order of the APIs A4 and A20 are mutated.

The automatic test case generation system disclosed herein provides numerous benefits. For example, it automatically generates test cases without no manual test case designing required. As another example, it avoids exhausting all combinations of the APIs of an SDK and thus saves computational resources and improves test efficiency. As yet another example, based on Pareto Optimality, it automatically generates test cases that can detect SDK crashes, and have high coverage and small test case depth.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for automatically generating test cases for testing a software development kits (SDK), said method performed by an automatic SDK testing case generation system and comprising:
   1) constructing a candidate set of application programming interfaces (APIs) from a list of APIs provided by an SDK;
   2) setting default values for parameters of APIs within said candidate set of APIs;
   3) categorizing APIs within said candidate set of APIs, thereby forming a set of categories of APIs, said set of categories of APIs conforming to an API call category sequence having a set of API call category sequence segments, each category of APIs belonging to a single segment within said set of API call category sequence segments, APIs within any individual category of APIs within said set of categories of APIs having a same API calling priority, categories of APIs within said set of categories of APIs belonging to a same segment within said set of API call category sequence segments having a same API calling priority, categories of APIs within said set of categories of APIs belonging to different segments within said set of API call category sequence segments having different API calling priorities;
   4) coding APIs within each category of APIs of said set of categories of APIs;
   5) determining a first API call path conforming to said API call category sequence;
   6) generating a first set of test cases conforming to said first API call path;
   7) operating on said first set of test cases to generate a first final subset of test cases;
   8) switching to a second API call path conforming to said API call category sequence;
   9) generating a second set of test cases conforming to said second API call path;
   10) operating on said second set of test cases to generate a second final subset of test cases; and
   11) combining said first final subset of test cases and said second final subset of test cases to form a final set of test cases.

2. The method of claim 1 wherein said generating a first set of test cases conforming to said first API call path comprising:
   1) Randomly determining a test case depth for a test case to be generated;
   2) Randomly determining a set of test case segment depths of said test case depth corresponding to said set of categories of APIs conforming to said first API call path, wherein a sum of all test case segment depths within said set of test case segment depths is same as said test case depth;
   3) From each category of APIs within said set of categories of APIs, randomly selecting a sequence of APIs, wherein a number of APIs within said selected sequence of APIs is the same as the corresponding test case segment depth within said set of test case segment depths; and
   4) setting said selected sequences of APIs collectively as API calls of said test case within said first set of test cases.

3. The method of claim 2 wherein said operating on said first set of test cases to generate a first final subset of test cases comprising:
   1) For each test case within said first set of test cases, decoding encoded APIs within said test case, thereby forming a decoded list of API calls;
   2) For each test case within said first set of test cases, causing said decoded list of API calls executed;
   3) For each test case within said first set of test cases, obtaining a set of test case objective functions of said test case is executed;
   4) Conducting a fitness evaluation on said sets of test case objective functions corresponding to said first set of test cases;
   5) Determining a fitness value for each test case within said first set of test cases, thereby forming a set of fitness values;
   6) Based on said set of fitness values, selecting a subset of test cases from said first set of test cases; and
   7) for each test case within said selected subset of test cases, deriving a set of test cases, wherein said selected subset of test cases and derived sets of test cases form said first final subset of test cases.

4. The method of claim 3 wherein:
   1) Each test case objective function within said set of test case objective functions includes said test case depth, a coverage and an SDK crash status; and
   2) said fitness value is derived from a fitness level.

5. The method of claim 3 wherein said deriving a set of test cases includes at least one of a crossover operation and a mutation operation.

6. The method of claim 1 wherein said generating a second set of test cases conforming to said second API call path comprising:
   1) Randomly determining a test case depth for a test case to be generated;
   2) Randomly determining a set of test case segment depths of said test case depth corresponding to said set of categories of APIs conforming to said second API call path, wherein a sum of all test case segment depths within said set of test case segment depths is same as said test case depth;
   3) From each category of APIs within said set of categories of APIs, randomly selecting a sequence of APIs, wherein a number of APIs within said selected sequence of APIs is the same as the corresponding test case segment depth within said set of test case segment depths; and
   4) setting said selected sequences of APIs collectively as API calls of said test case within said second set of test cases.

7. The method of claim 6 wherein said operating on said second set of test cases to generate a second final subset of test cases comprising:
   1) For each test case within said second set of test cases, decoding encoded APIs within said test case, thereby forming a decoded list of API calls;
   2) For each test case within said second set of test cases, causing said decoded list of API calls executed;
   3) For each test case within said second set of test cases, obtaining a set of test case objective functions of said test case is executed;
   4) Conducting a fitness evaluation on said sets of test case objective functions corresponding to said second set of test cases;

5) Determining a fitness value for each test case within said second set of test cases, thereby forming a set of fitness values;
6) Based on said set of fitness values, selecting a subset of test cases from said second set of test cases; and
7) for each test case within said selected subset of test cases, deriving a set of test cases, wherein said selected subset of test cases and derived sets of test cases form said second final subset of test cases.

8. The method of claim 7 wherein:
1) Each test case objective function within said set of test case objective functions includes said test case depth, a coverage and an SDK crash status; and
2) said fitness value is derived from a fitness level.

9. The method of claim 7 wherein said deriving a set of test cases includes at least one of a crossover operation and a mutation operation.

\* \* \* \* \*